June 17, 1930.  R. P. LANSING  1,764,046
VEHICLE SPRING CONTROLLER
Filed Jan. 7, 1927  2 Sheets-Sheet 1
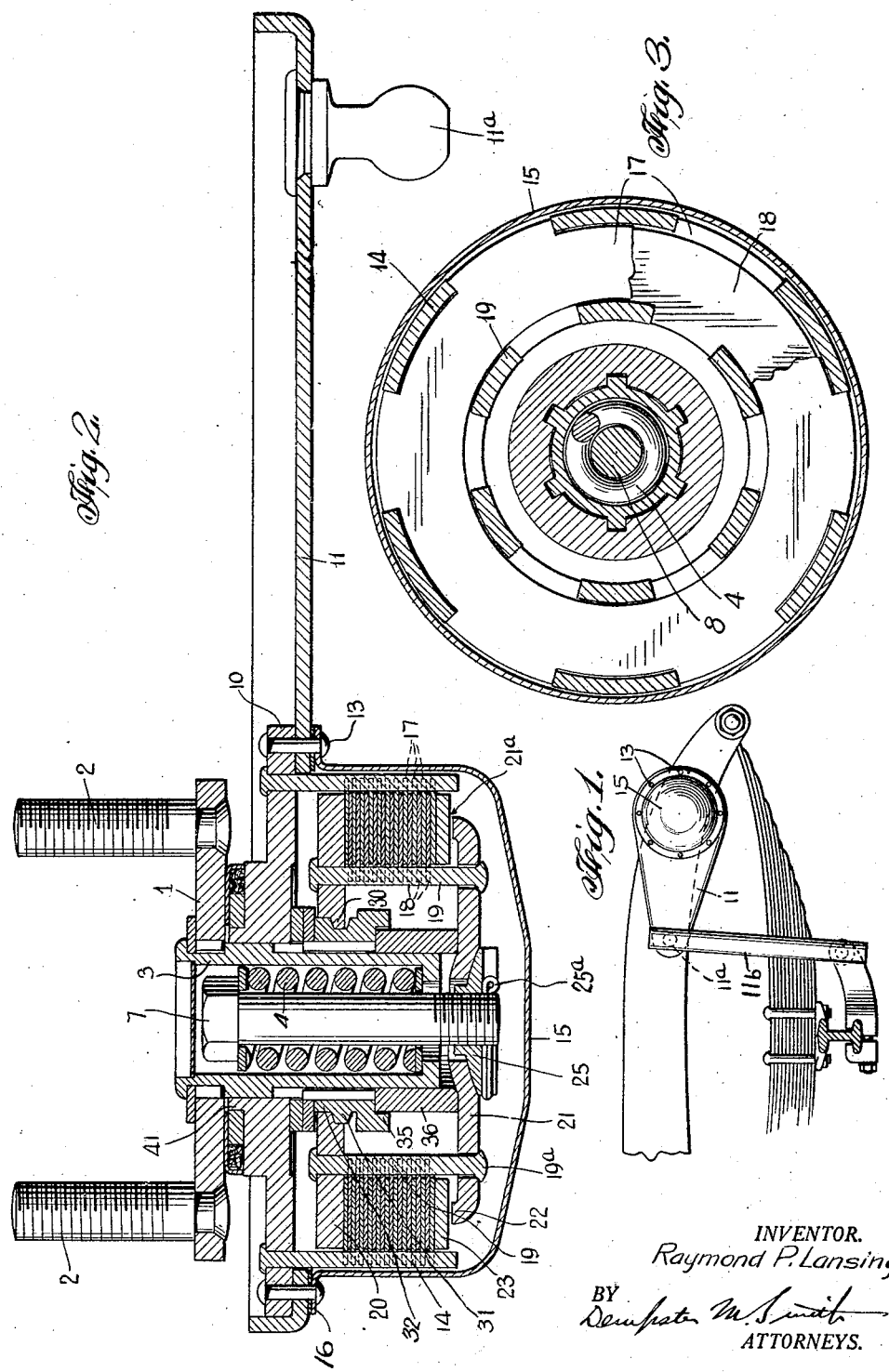
INVENTOR.
Raymond P. Lansing
BY
Dempster M. Smith
ATTORNEYS.

June 17, 1930.   R. P. LANSING   1,764,046
VEHICLE SPRING CONTROLLER
Filed Jan. 7, 1927   2 Sheets-Sheet 2
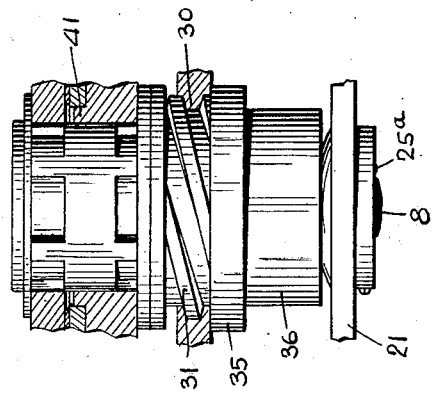
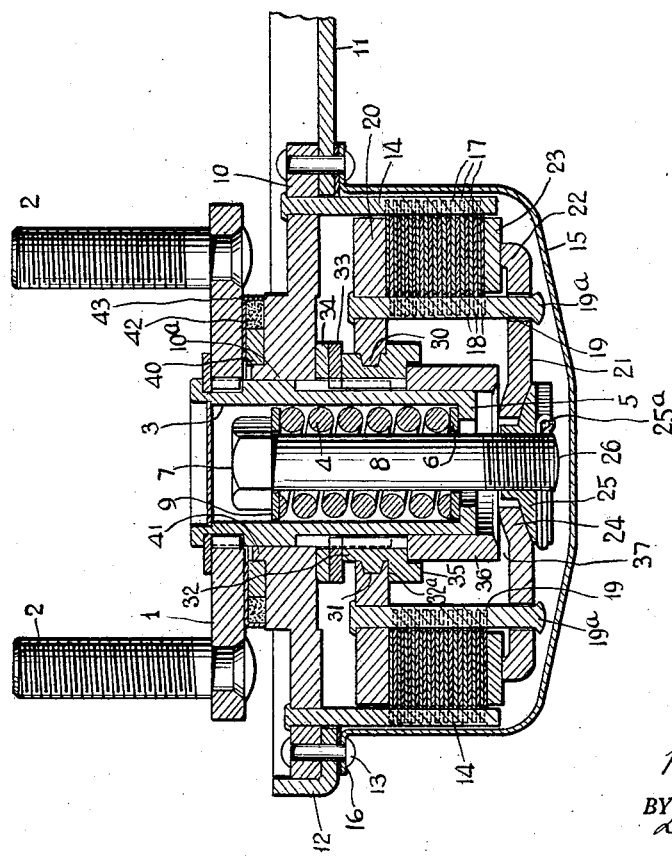
INVENTOR.
Raymond P. Lansing
BY
ATTORNEYS.

Patented June 17, 1930

1,764,046

UNITED STATES PATENT OFFICE

RAYMOND P. LANSING, OF MONTCLAIR, NEW JERSEY

VEHICLE SPRING CONTROLLER

Application filed January 7, 1927. Serial No. 159,570.

My invention relates to vehicle spring controllers, and the general object is to provide an instrument of the friction type which is of simple and economical structure, and which has various new or improved operative characteristics referred to hereafter.

A more particular object is to so construct and arrange the parts that tendency to jam in operation is prevented by avoiding the use of sliding or splined connections at certain points; or in other words, by so designing and arranging certain of the principal operating parts that slidable splined connection of such parts is avoided.

The characteristics and advantages of the invention are further sufficiently explained in connection with the following detail description of the accompanying drawings, which show a representative embodiment of the invention. After considering this example, skilled persons will understand that many variations may be made, and I contemplate the employment of any structures that are properly within the scope of the appended claims.

Fig. 1 is a side elevation of the shock absorber applied in one suitable position to a motor vehicle.

Fig. 2 is a horizontal section of mechanism embodying the invention in one form.

Fig. 3 is a composite vertical section in different planes.

Fig. 4 is a section similar to Fig. 2, showing the parts in a different position.

Fig. 5 is a partial section, showing some of the parts in plan.

A base plate 1 has any suitable arrangement or means such as stud bolts 2 for securing it to a vehicle part, such as the vertical web of a chassis side frame member. A hollow spindle 3 is irrevolubly secured in an aperture at the center of the base plate. This hollow spindle provides for the convenient mounting or housing of the yieldable pressure member, which is specifically a helical compression spring 4. The outward end of this spring bears against an inturned abutment flange 5 at the outer end of the spindle, and this contact may be direct, but preferably a washer 6 is interposed. The inward end of the spring bears against the head 7 of a bolt 8 (usually with an interposed washer 9).

Various parts are provided which are arranged for simultaneous rotation in relation to the spindle and base plate 1, these parts constituting what may conveniently be described as the rotary structure R. This structure or combination of parts includes an inner plate 10 having a central bore which constitutes a bearing 10ª upon an inward part of the spindle. An arm or lever 11 has a dished and apertured hub 12 overlying the peripheral margin of plate 10 and secured thereto as by rivets 13. The arm is made separate from the plate, mainly for convenience of manufacture and assembly. At its free end the lever has any suitable means such as the ball fitting 11ª for connection to a link 11ᵇ which is in turn connected to a vehicle part, such as the axle. Spaced, axially-extending spline members 14 are secured in plate 10. A dished or cup-like cover 15, provided with a flange 16 secured to the lever hub, conveniently by the rivets 13 above mentioned, encloses all the outer part of the mechanism and in connection with the inner rotor plate 10 provides for the dirt- and waterproof enclosure or housing of practically all the mechanism, and also provides for retaining grease or oil.

Any suitable plurality of annular friction discs 17 are arranged within the spline members 14, and these discs have spaced teeth or flanges engaging between the spaced spline members to connect the discs relatively with the splines and the entire rotary structure, and since these discs always move in unison with the rotary structure, they may be referred to for identification as rotary discs, or otherwise as outer discs, because their spaced jaws or teeth engage the outer splined members 14. Interspaced with the rotary or outer discs are other discs 18, which at times revolve with discs 17 and at other times are relatively stationary, and for convenient distinction therefore, the discs 18 may be referred to as inner discs or otherwise, as intermittently-movable discs. The discs 18 have their apertures provided with inwardly projecting, spaced jaws or teeth engaging between the spaced, axially-extending inner spline members 19. The inward ends of the splines 19 are fixedly secured in an annular plate 20 which constitutes a movable pressure plate, or otherwise may be identified as a nut because of its co-operation with a screw referred to later. The outward ends of spline members 19 pass slidably through apertures in a plate 21, which may be identified as a pressure abutment plate, and the ends of the splines are peened as at 19$^a$, to provide stops limiting the separating movement of plates 20 and 21, this relative plate movement being to provide for sufficient freedom or separation of the disc pack when friction pressure is relaxed, or during certain movements of the rotary structure.

At the periphery of plate 21 is an inturned flange 22 engaging a washer 23 which bears on the outer disc of the disc pack while the inner disc bears against the outer face of pressure plate 20. The central portion of plate 21 is formed as a part-spherical cup 24 bearing against a part-spherical inner formation of a nut 25, the thread of which engages screw thread 26 formed on the outward end of screw or bolts 8 above mentioned. Rotation of the nut 25 upon the screw provides for regulating the effective initial pressure of spring 4. Adjustment of the nut is fixed by a cotter pin 25$^a$.

The bore of pressure plate 20 is formed with helical screw threads 30 of substantially steep pitch and these engage the complemental threads 31 of a screw member, conveniently identified in some cases an an "actuator", 32, which has internal jaws or splines engaging channels in the periphery of the spindle. While this connection resembles a spline connection, it is not for the purpose of permitting axial sliding of the screw or actuator, but only to prevent rotation of the latter, which, in operation, is stationary. By so avoiding any axial movement of the screw or actuator any possibility of a jamming or locking action is avoided, which might otherwise be caused by binding or sticking of the splines, in cases where the screw or actuator must move axially in relation to its spindle or other support.

The inward end of the actuator, in effect, bears against the outer face of inner rotary plate 10, but usually spacing washers, such as 33 and 34, are interposed. The outward end of the actuator is shaped to provide a socket 35 for the inward end of a cylindrical spacer 36, the outward end of which confronts the inner face of pressure abutment plate 21. This spacer acts merely as an extension of the actuator to co-operate with plate 21, in the same manner as if the spacer were integral with the actuator. Adjacent this socket a flange or shoulder 32$^a$ is provided to act as a stop, limiting rotary movement and axial travel of the pressure plate or nut in one direction.

The spring pressure reaction urges the entire rotary structure forcibly toward the base plate 1, and to properly resist this pressure and provide for rotation of plate 10 and other parts of the rotary structure, a washer 40 of moderate diameter is placed between adjacent faces of plates 1 and 10, and is properly located by a shallow flange 41 on the inward face of plate 10. Washer 40 serves as a thrust bearing and is not, in preferred constructions, designed to provide any material friction effect and for that purpose is usually of such material as bronze, which has a low friction coefficient in contact with steel or iron, and is also of small mean radius, so that the friction effect for most purposes is negligible. To keep dirt and moisture away from the thrust bearing surface, and also to assist in sealing the rotary structure or housing, a packing ring 42 of felt or other suitable material is placed about bearing washer 40 between plates 1 and 10, and is properly held by a thin cupped washer 43.

The structure described is designed to apply substantial frictional resistance to movement of arm 11 in one direction and reduced or negligible resistance to arm movement in the other direction; thus, when the instrument is properly applied to a motor vehicle the action of the vehicle spring will be substantially controlled or retarded in one direction, and substantially free in the other. It is usually considered desirable to control or check the vehicle spring in its recoil stroke, and in describing the operation it will be understood that with right-hand nut and shifter threads 30, 31, as shown, and with the instrument applied to the motor vehicle in proper position, the lever arm 11 oscillates clockwise about the spindle as the vehicle spring is compressed, with accompanying movement of the axle toward the frame, and the arm moves counter-clockwise as the vehicle spring reacts with accompanying movement of the axle away from the frame.

Fig. 2 shows the position of the parts after any considerable vehicle spring compression with accompanying clockwise movement of arm 11. In this movement the entire rotary structure, including arm 11, plate 10, outer or rotary discs 17 and pressure plate 20, have moved in the stated direction until the pressure abutment plate 21 has been seated upon the outer end of spacer 36, and the pressure plate has moved inward until the stop heads 19$^a$ at the outer ends of splines 19, rest against the outer face of the pressure abutment plate 21, thus permitting separation of the friction discs. The pressure of spring 4 is self-contained and ineffective, being taken up between the spindle abutment shoulder 5, the head of screw 8, nut 25, and the pressure abutment plate resting on spacer 36, which is in turn supported by the screw, spacing washers 33 and 34, and plate 10. Sufficient travel of the pressure plate is provided between its abutment $32^a$ and washer 33, so that in the stated position of the pressure plate, that is, its inward position, a slight, but substantial clearance is established, as at $21^a$, between the outer ring 23 of the disc pack and the flange 22 of the pressure abutment plate 21. There is therefore no pressure upon the disc pack and the discs are substantially loose or free, although there is sufficient frictional tendency, produced by films of lubricant, to cause the discs, pressure plate and pressure abutment plate to move in correspondence with any movement of arm 11.

If the vehicle spring compression which resulted in bringing the parts to the position of Fig. 2, as above explained, was of considerable extent, a reaction or expansion of the vehicle spring of considerable extent will follow. In the first small angle of arm movement the frictional drag of the discs above referred to causes the discs and pressure plate 20 to move together, along with the arm. In the rotary movement of the pressure plate the screw threads cause it to move outward and after slight outward movement the clearance at $21^a$ is taken up. Thereafter further rotation and outward movement of the pressure plate tends to "lift" or move outward the pressure abutment plate, or in other words, brings the spring pressure to bear upon the disc pack and hold the discs in firm engagement, sufficient to cause them to move together and to continue to impel the pressure plate rotatively with accompanying additional compression of spring 4, until the pressure plate strikes the outer screw abutment $32^a$.

This range of movement during which the spring is additionally compressed, is conveniently called the "spring wind-up period", and the work required to compress the spring, of course, opposes a definite resistance to the arm movement and therefore resists the vehicle axle recoil, although this resistance is inferior to that provided by the frictional action of the device, which now ensues. As soon as the pressure plate strikes abutment $32^a$ its further rotation and outward movement is prevented, and thereafter the outer friction discs 17 continue to move along with the arm with the full spring pressure applied to them through the pressure abutment plate. Until the vehicle spring recoil movement ceases therefore, full frictional resistance is applied to such movement, checking or controlling the movement to an extent which is proportional to the pressure value of spring 4, and this resistance is substantially constant throughout its range, except for the variation provided by the changing angularity of arm 11.

Fig. 4 shows the position of the parts after a considerable recoil movement such as described. It will be noted that the pressure abutment plate has been "lifted" or moved outward away from the end of spacer 36, producing a clearance at 37 which is substantially equal to the clearance between the inner face of the pressure plate and washer 33, less the clearance normally existing at $21^a$, Fig. 2.

After any considerable vehicle spring recoil, such as that above described, the vehicle spring will again be compressed and in this movement arm 11 moves clockwise. Throughout the first part of such a movement, spring 4 opposes no resistance but rather tends to facilitate the movement, due to the steep pitch of the screw threads, and there is therefore in the described arrangement no resistance to vehicle spring compression. After travel of arm 11 through a substantial arc in the stated direction the inward movement of pressure plate 20, caused by the screw threads, bring the pressure abutment plate 21 in contact with the outer end of spacer 36, and still further arm movement then moves the pressure plate slightly further inward, freeing the disc pack and producing the clearance at $21^a$, Fig. 2; in other words, the parts are again in the position of Fig. 2.

It will now be understood that in the entire action of the appliance, the screw remains axially stationary and there is therefore no possibility for it to cause any binding or breakage of any parts of the structure by the sticking or interlocking of irregularities of its spline connections during such an axial movement.

While the screw threads have been described as having a right-hand lead, this has reference only to the positions of other parts shown, and left-hand screws may be used by a repositioning of the lever arm in relation to other parts of the structure.

I claim:—

1. An appliance of the class described, comprising friction means adapted to be connected to a part of a vehicle, such as a frame member, other friction means arranged for relative oscillation and adapted to be connected to another vehicle part such as an axle, a central axial support, yieldable pressure means, a stationary actuator distinct from said support, a revoluble member, and an inclined connection between the revoluble member and the actuator to make the pressure means effective in one direction of rotation.

2. An appliance of the class described, comprising a base adapted for connection to a vehicle part, a spindle extending therefrom, a stationary actuator on the spindle and distinct therefrom, relatively revoluble friction members, a spring, and a rotary member to co-operate with the friction members and having an angular connection with the actuator to produce substantial axial movement of said member as it rotates in relation to the actuator.

3. An appliance of the class described, comprising a base adapted for connection to a vehicle part, a spindle extending therefrom, a plate arranged for rotation about the spindle, a lever arm extending from the plate and adapted for connection to another vehicle part, a spring, relatively revoluble friction discs, a pressure plate, an actuator in stationary position on the spindle, the actuator and pressure plate having co-operating screw threads, and means by which rotary movement of the pressure plate and axial movement thereof caused by the screw thread makes the spring effective to apply frictional resistance to movement of the arm in one direction.

4. An appliance of the class described, comprising a base adapted for connection to a vehicle part, a hollow spindle projecting therefrom, a spring located within the spindle and engaging an outer abutment therein, a fixed actuator on the spindle having a screw thread, a plate revoluble about the spindle and having a lever arm, friction discs connected to move with the arm and plate, a pressure plate having a screw thread co-operating with the actuator thread, a pressure abutment plate, other friction discs connected to move with the pressure plate and interleaved with the discs first mentioned, and means connecting the pressure abutment plate with the inward end of the spring.

5. An appliance of the class described, comprising a base adapted for connection to a vehicle part, a hollow spindle projecting therefrom, a spring located within the spindle and engaging an outer abutment therein, a fixed actuator on the spindle having a screw thread, a plate revoluble about the spindle and having a lever arm, friction discs connected to move with the arm and plate, a pressure plate having a screw thread co-operating with the actuator thread, a pressure abutment plate, other friction discs connected to move with the pressure plate and interleaved with the discs first mentioned, means connecting the pressure abutment plate with the inward end of the spring, and stops to limit axial and rotary movement of the pressure plate.

6. An appliance of the class described, comprising a base adapted for connection to a vehicle part, a hollow spindle projecting therefrom, a spring located within the spindle and engaging an outer abutment therein, a fixed actuator on the spindle having a screw thread, a plate revoluble about the spindle and having a lever arm, friction discs connected to move with the arm and plate, a pressure plate having a screw thread co-operating with the actuator thread, a pressure abutment plate, other friction discs connected to move with the pressure plate and interleaved with the discs first mentioned, means connecting the pressure abutment plate with the inward end of the spring, the parts being arranged so that in one of their positions the pressure of the spring is self-contained and ineffective and after movement of the arm in one direction the spring is compressed and its force applied through the pressure abutment plates to the discs and this pressure is resisted by the pressure plate to produce frictional resistance to arm movement in the stated direction.

7. A shock absorber comprising relatively-movable friction members, a central spindle, a pressure member, a stationary actuator separate from the spindle, and means co-operating with the actuator to apply pressure to the friction members.

8. An appliance of the class described, comprising a base, a tubular spindle projecting laterally therefrom, a separate actuator in normally fixed position about the spindle, a spring within the spindle, friction means, and parts intermediate the spring and actuator to transfer spring force to the friction means and cause frictional slippage therein.

9. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at one end thereof and having screw connection with the actuator, the other discs of said pack being connected to move with said plate, a spring within the spindle having an outward abutment, and means engaging the inward end of the spring for transferring effective pressure thereof to the end of the disc pack opposite that which is engaged by the pressure plate.

10. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at its inward end and having screw connection with the actuator, the other discs of said pack being connected to move the said plate, a spring within the spindle having an outward abutment, and means engaging the inward end of the spring for transferring effective pressure thereof to the outward end of the disc pack.

11. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at one end thereof and having screw connection with the actuator, the other discs of said pack being connected to move with said plate, a spring within the spindle having an outward abutment, and means engaging the inward end of the spring for transferring effective pressure thereof to the end of the disc pack opposite that which is engaged by the pressure plate, said means including a bolt passing through the spindle and a pressure plate engaged with the outward end of the spindle.

12. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at its inward end and having screw connection with the actuator, the other discs of said pack being connected to move with said plate, a spring within the spindle having an outward abutment, and means engaging the inward end of the spring for transferring effective pressure thereof to the outward end of the disc pack, said means including a bolt passing through the spindle and a pressure plate engaged with the outward end of the spindle.

13. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at one end thereof and having screw connection with the actuator, the other discs of said pack being connected to move with said plate, a spring within the spindle having an outward abutment, and means engaging the inward end of the spring for transferring effective pressure thereof to the end of the disc pack opposite that which is engaged by the pressure plate, said means including a bolt passing through the spindle and a pressure plate engaged with the outward end of the spindle, and means serving in one operative position of the parts to make the spring pressure substantially self-contained and ineffective.

14. A vehicle spring controller comprising a base, a tubular spindle extending laterally therefrom, a plate revolvable about the spindle and having a lever arm, a pack of friction discs about the spindle, corresponding ones of said discs being connected to rotate with said plate and lever arm, an actuator on the spindle and relatively immovable in operation, a pressure plate engaging said disc pack at one end thereof and having screw connection with the actuator, the other discs of said pack being connected to move with said plate, a spring within the spindle having an outward abutment, and means engaging the inward end of the spring for transferring effective pressure thereof to the end of the disc pack opposite that which is engaged by the pressure plate, said means including a bolt passing through the spindle and a pressure plate engaged with the outward end of the spindle, and means arranged substantially as an extension of the actuator and serving in one operative position of the parts to make the spring pressure substantially self-contained and ineffective.

15. In an appliance of the class described, a base plate and a flanged spindle inserted in an aperture therein, the stated parts being provided with interlocking members preventing relative rotation, and a disc interlocking with the spindle under the flange and engaging the base and preventing axial displacement of the spindle.

16. In an appliance of the class described, a base plate and a flanged tubular spindle inserted in an aperture therein, the stated parts being provided with interlocking members preventing relative rotation, and a disc interlocking with the spindle under the flange and engaging the base and preventing axial displacement of the spindle.

17. The structure defined in claim 1 with the addition that the actuator is in the form of a screw and the revoluble member is in the form of a pressure plate having a central threaded aperture co-operating with the screw.

18. The structure defined in claim 2 with the addition that the actuator is in the form of a screw having immovable spline connection to the spindle, and the rotary member is in the form of a pressure plate threaded to co-operate with the actuator screw.

Signed at New York, in the county of New York and State of New York, this 6th day of January A. D. 1927.

RAYMOND P. LANSING.